United States Patent
Bequet

(10) Patent No.: US 7,874,517 B2
(45) Date of Patent: Jan. 25, 2011

(54) PROCESS FOR MAKING A COMPOSITE MATERIAL ASSEMBLY AND AIRCRAFT WING AND STABILIZING ELEMENT OBTAINED BY THIS PROCESS

(75) Inventor: Franck Bequet, Fonsorbes (FR)

(73) Assignee: Airbus France, Toulouse Cedex (FR)

( * ) Notice: Subject to any disclaimer, the term of this patent is extended or adjusted under 35 U.S.C. 154(b) by 1199 days.

(21) Appl. No.: 11/147,011

(22) Filed: Jun. 6, 2005

(65) Prior Publication Data

US 2006/0076102 A1 Apr. 13, 2006

Related U.S. Application Data

(62) Division of application No. 10/304,654, filed on Nov. 25, 2002, now Pat. No. 6,908,526.

(30) Foreign Application Priority Data

Nov. 26, 2001 (FR) .................................. 01 15264

(51) Int. Cl.
*B64C 5/00* (2006.01)
*B64C 3/00* (2006.01)
(52) U.S. Cl. .................................. 244/123.1; 244/133
(58) Field of Classification Search .............. 244/123.1, 244/123.14, 123.8, 133, 87; 242/437.4, 437.3; 156/166, 169, 173, 175; 428/113
See application file for complete search history.

(56) References Cited

U.S. PATENT DOCUMENTS

| | | | |
|---|---|---|---|
| 3,687,795 A | | 8/1972 | Elkin |
| 4,412,784 A | * | 11/1983 | Wackerle et al. ............ 416/230 |
| 4,437,616 A | | 3/1984 | Magarian et al. |
| 4,601,770 A | | 7/1986 | Ulrich et al. |
| 4,741,943 A | | 5/1988 | Hunt |
| 5,632,602 A | * | 5/1997 | Herrmann et al. ........... 416/226 |
| 6,190,484 B1 | * | 2/2001 | Appa .......................... 156/189 |
| 6,202,959 B1 | * | 3/2001 | Hyde .......................... 244/87 |

* cited by examiner

*Primary Examiner*—Tien Dinh
*Assistant Examiner*—Richard R Green
(74) *Attorney, Agent, or Firm*—Nixon Peabody LLP

(57) ABSTRACT

Process for manufacturing an assembly made of a composite material and wing and stabilizing element obtained by this process.

The junction zone for a part (P) made of a composite material comprising two parts (A1, A2) in which the principal directions intersect at a non-singular angle, is made in a single operation by continuous lay-up. The 0° directions of the lay-up coordinate systems (R1, R2) of the parts (A1, A2) are oriented such that these directions make an angle of close to 180°−θ°, where ±θ° represents the other directions of the lay-up coordinate systems (R1, R2). Thus, the layers of fibers oriented at 0° in one of the coordinate systems correspond approximately to a lay-up direction of ±θ° in the other coordinate system.

2 Claims, 2 Drawing Sheets

PROCESS FOR MAKING A COMPOSITE MATERIAL ASSEMBLY AND AIRCRAFT WING AND STABILIZING ELEMENT OBTAINED BY THIS PROCESS

CROSS-REFERENCE TO RELATED APPLICATION

This is a divisional application based on application Ser. No. 10/304,654, entitled "Process for Making a Composite Material Assembly and Aircraft Wing and Stabilizing Element Obtained by this Process" by Franck Bequet, filed on Nov. 25, 2002 now U.S. Pat. No. 6,908,526, which claims priority based on French patent application 01/15264, filed on Nov. 26, 2001.

TECHNICAL FIELD

This invention relates mainly to a process for manufacturing part or all of a composite material assembly comprising at least two zones in which the principal directions form a non-singular angle between each other, in other words an angle significantly different from 0° and 180°, making use of the continuous lay-up technique.

The invention also relates to an aircraft wing and a stabilizing element such as an aircraft control surface obtained by this process.

Throughout the text, the expression "principal direction" denotes the longest direction of the zone considered and/or the direction of the principal forces, in other words for example the direction corresponding to the longitudinal axis of this zone when there is such an axis.

STATE OF THE ART

In a known manner, when a composite material assembly comprises at least two zones in which the angle between the principal directions is non-singular, the first step is to make each of the said zones separately from each other. The next step is then to assemble the different parts using mechanical means such as fishplates or equivalent means.

This type of assembly is often inconvenient. It almost systematically requires drillings in the parts to be assembled. These drillings cause stress concentrations that require local thickening of the part and therefore increase its weight.

Furthermore, due to the fact that composite materials are often made from carbon fibers and that mechanical attachments frequently comprise metallic elements, many precautions have to be taken during assembly to prevent the formation of a galvanic carbon-metal couple that would be a source of corrosion.

Another problem that arises due to this type of assembly relates to the necessary accessibility to make a junction of all parts. This access is sometimes difficult, if not impossible.

Transfers of forces between the different parts in the junction zone may also cause different problems. Thus, for example, the position of mechanical devices forming the junction may shift the neutral axis.

Furthermore, the need to assemble parts made by lay-up is a cause of extra cost. It requires additional labor, precision machining of all parts, reinforcement of the said parts as described above, etc. Furthermore, some manufacturing processes for composite materials, and particularly processes consisting of stacking plies, can cause thickness tolerances that are incompatible with the required dimensions. When dimensions have to be respected with tolerances stricter than are possible using the said processes, particularly when the manufactured parts have to be adjusted to each other or with other parts, one known solution consists of adding additional plies called "dead plies" and machining them to obtain the required dimensions. However, this solution has a number of disadvantages such as extra cost, risk of damaging parts during machining manipulations, etc.

In a known manner, the lay-up of a part made of a composite material consists of stacking layers of long fibers such as carbon fibers, such that the fibers of the different layers are oriented along different directions.

By way of example, the fibers of the different layers forming a particular part may be oriented along four different directions. Taking the principal direction of the part as reference, these directions may be for example 0°, ±45°, −45° and 90°. The percentage of fibers corresponding to each direction is modified to obtain the required characteristics for the part thus made. Still by way of example, a part made of a composite material with a conventional design may comprise 50% of fibers in the 0° direction, 20% of fibers, in the +45° direction, 20% of fibers in the −45° direction and 10% of fibers in the 90° direction.

Obviously, these different values are only given by way of example. Thus, force flows and the geometry of the part may result in different lay-up directions, for example such as 0°, +30° and −30° and/or +60°, −60° and 90° from the principal direction of the part.

PRESENTATION OF THE INVENTION

The main purpose of the invention is a process for manufacturing an assembly made of a composite material comprising at least two zones, in which the angle between the principal directions is non-singular, in which the lay-up is done continuously between the said zones, in other words without it being necessary to use any additional mechanical assembly means.

According to the invention, this result is achieved using a process for manufacturing a part made of a composite material comprising at least two parts with the angle between the principal directions being significantly different from 0°, in a junction zone between the said parts, the process comprising for each of the said portions of the part, a continuous lay-up step of at least one layer, along predetermined lay-up coordinate systems comprising a 0° direction and at least one other direction at ±θ°, characterized in that the lay-up coordinate systems in each of the said parts are chosen such that the angle between the 0° directions of each coordinate system is about 180°−θ°, and the said layer is laid up continuously in the junction zone.

By making it possible to do the lay-up continuously between the different portions of the part, this process avoids the need for subsequent assembly of these portions, at least for some of the layers. This means that junction elements (fishplates, etc.) and stiffeners in the junction zone can be eliminated. Therefore, the part is lighter in weight.

Furthermore, the aerodynamic characteristics of the part are improved, since the disturbance resulting from the presence of a junction element is eliminated without it being necessary to embed the junction element in the structure as is divulged according to prior art.

Furthermore, costs and the manufacturing time are reduced since assembly operations are avoided.

Finally, when the different portions of the part have to be connected to each other in a leak tight manner, for example when the part is an aircraft wing used as a fuel tank, continuous lay-up eliminates any leak tightness problems.

If each of the lay-up coordinate systems comprises a 0° direction, a −45° direction and a +45° direction, the said coordinate systems are chosen such that the angle between each of the 0° directions is about 135°.

If each of the lay-up coordinate systems comprises a 0° direction, a −30° direction and a +30° direction, the said coordinate systems are chosen such that the angle between each of the 0° directions is about 120°.

Finally, if each of the lay-up coordinate systems comprises a 0° direction, a −60° direction and a +60° direction, the said coordinate systems are chosen such that the angle between each of the 0° directions is about 60°.

According to one preferred embodiment of the invention, the 0° direction of each lay-up coordinate system is oriented to be approximately parallel to the principal direction of the forces that will be applied to the corresponding portion of the part. In this embodiment, the two portions of the part form an angle of 180°−θ°, or approximately this value, between each other.

According to one variant embodiment, the 0° direction of each lay-up coordinate system is approximately parallel to an outside edge of the corresponding part, the said outside edge being oriented approximately along the principal direction of the said part. For example, when the part is an aircraft wing, the 0° direction may be equal to or approximately equal to the direction of the leading edge or the trailing edge of the wing box.

In another variant embodiment of the invention, the 0° direction of each lay-up coordinate system is oriented along an intermediate direction between two outer edges of the corresponding part, the said intermediate direction being oriented approximately along the principal direction of the said part.

In another variant embodiment of the invention, the 0° direction of each lay-up coordinate system may go beyond the angular limits defined in the previous variant as being the outer edges of the corresponding part. In particular, going beyond these limits makes it possible to make anisotropic lay-ups and/or to make parts with aero-elasticity properties that may be necessary, according to the required deformations of the said parts when forces are applied to them.

In yet another variant embodiment of the invention, the part is made by winding fibers and/or layers around the said part being manufactured.

Another purpose of the invention is an aircraft wing and an aircraft stabilizing element obtained by this process.

BRIEF DESCRIPTION OF THE DRAWINGS

We will now describe the different embodiments of the invention with reference to the attached drawings, in which.

DETAILED DESCRIPTION OF PREFERRED EMBODIMENTS OF THE INVENTION

Figure 1:
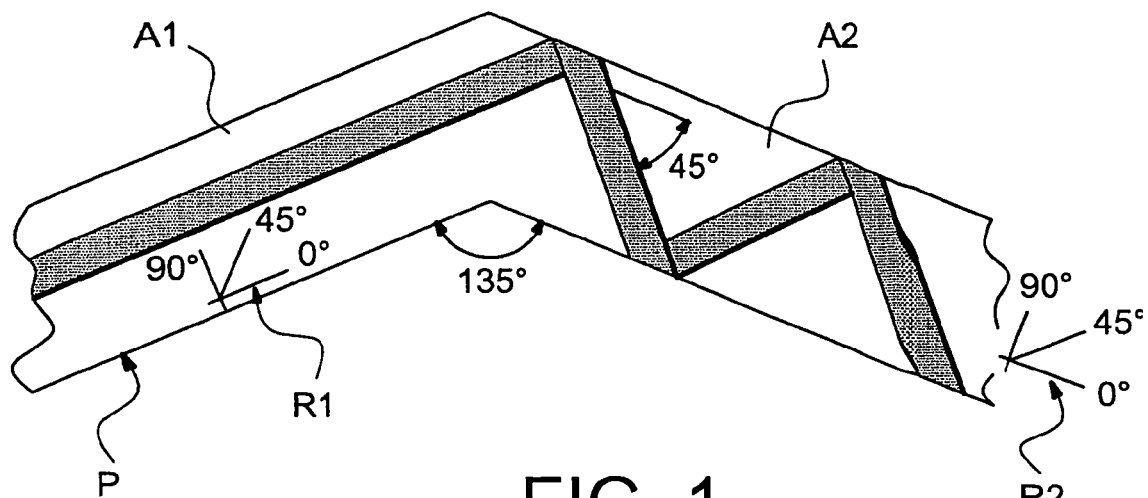
FIG. 1 is a top view diagrammatically illustrating the continuous lay-up along the 0°, −45°, +45° directions, of a part with two portions in which angle between the principal directions is non-singular, according to the invention.

As illustrated diagrammatically in FIG. 1, the invention relates to the manufacture of the junction zone between two non-aligned parts A1 and A2 of a part P made of a composite material, in a single step by continuous lay-up. More precisely, the two parts A1 and A2 have principal directions that intersect with a non-singular angle between them, in other words an angle significantly different from 0° or 180° C.

In the example embodiment illustrated in FIG. 1, the long fiber layers are laid up in each of the two parts A1 and A2 along the 0°, −45°, +45° and 90° directions with respect to a lay-up coordinate system R1, R2 associated with the corresponding part. Obviously, the invention is also applicable to other lay-up directions, for example such as the 0°, −30°, +30° and 0°, −60°, +60° directions.

According to the invention, the 0° directions of the lay-up coordinate systems R1 and R2 of portions A1 and A2 of the part are oriented such that the angle between them is equal to approximately 180°−θ°, if a lay-up direction other than 0° is denoted as +θ°.

In the embodiment shown in FIG. 1, the result is that the 0° directions of the lay-up coordinate systems R1 and R2 are oriented such that the angle between them is about 135°. As shown diagrammatically in FIG. 1, the layers of fibers oriented along the 0° direction in the first coordinate system R1 are thus systematically oriented at ±45° in the second coordinate system R2, which corresponds to one of the lay-up directions of the second part A2. Conversely, fibers oriented at 0° in the second coordinate system R2 correspond to a ±45° orientation in the first coordinate system R1.

Thus, the lay-up process according to the invention makes it possible to cross fiber layers in the junction zone between parts A1 and A2. Consequently, fiber layers are oriented along preferred lay-up directions in the first coordinate system R1 and in the second coordinate system R2.

If the lay-up directions are 0°, −30° and +30°, application of the process according to the invention will lead to the 0° directions of the lay-up coordinate systems R1 and R2 of portions A1 and A2 being oriented such that the angle between them is equal to about 120°.

Similarly, application of the process according to the invention to the case in which the lay-up directions are 0°, −60° and +60° will lead to the 0° directions of the lay-up coordinate systems R1 and R2 of portions A1 and A2 being oriented such that the angle between them is equal to about 60°.

Figure 2:
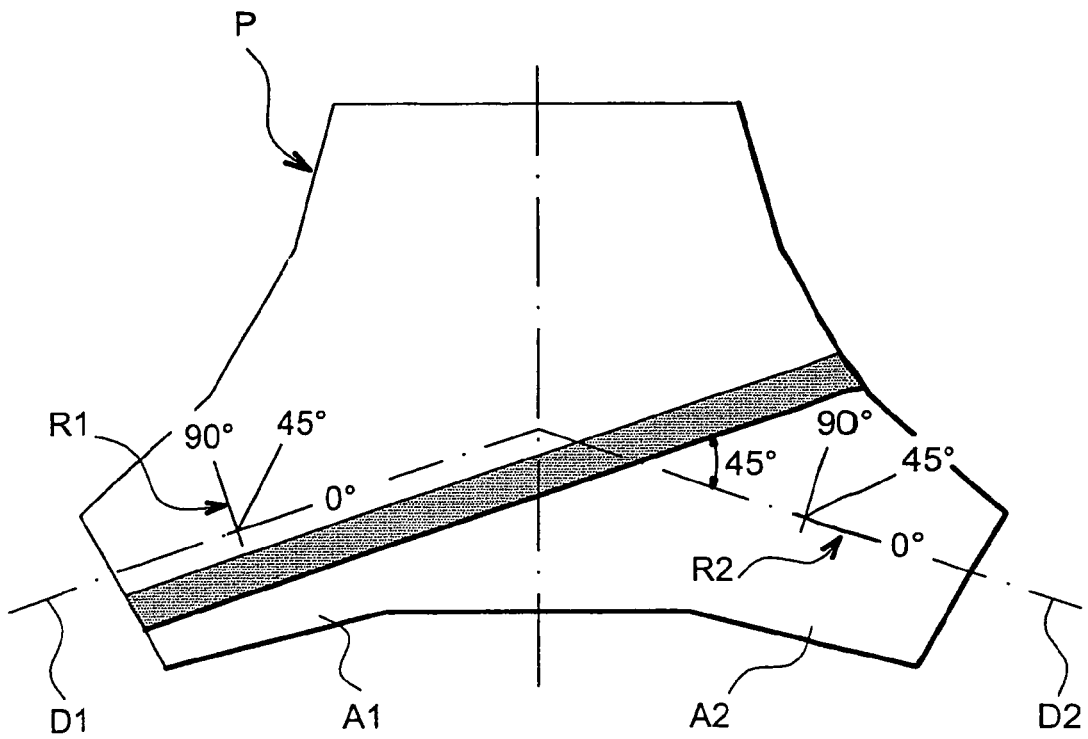
FIG. 2 is a top view comparable to FIG. 1, illustrating an application of the process to the manufacture of an aircraft wing, in the preferred embodiment of the invention in which the 0° directions of the lay-up in each of the wings correspond to the principal direction of the forces applied on the wing.

FIG. 2 illustrates a preferred embodiment of the invention in which the process is applied to the manufacture of the junction zone between the two wings A1 and A2 of an aircraft wing forming part P.

In this case, the 0° direction of each of the coordinate systems R1 and R2 is aligned with the principal direction D1 and D2 of the forces that will subsequently be applied on each of the wings A1 and A2. The principal direction D1 and D2 then coincides with the longitudinal axis of the corresponding wing A1, A2. This means that the angle formed between the longitudinal axes of the wings is equal to approximately 180°−θ° (about 135° in the case shown in FIG. 2, in which lay-up directions are 0°, −45°, +45° and 90°).

Figure 3:
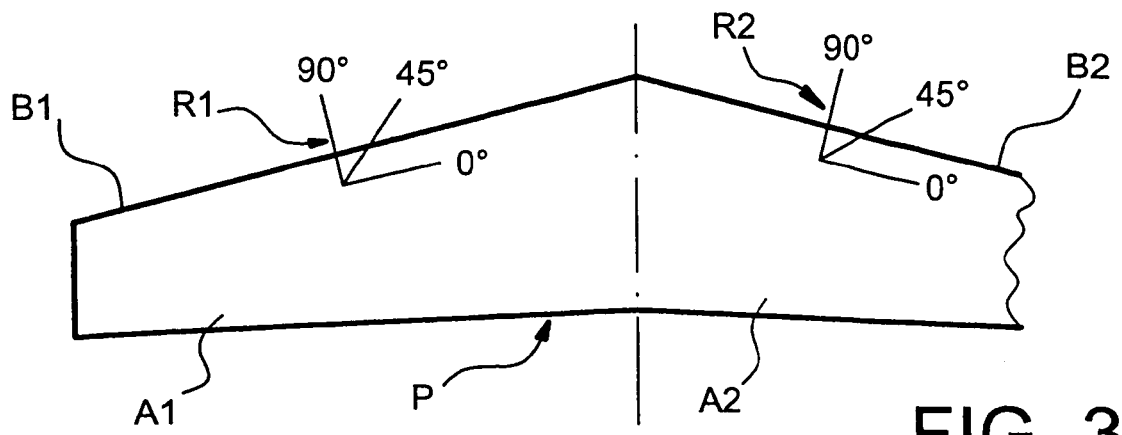
FIG. 3 is a view comparable to FIG. 2, illustrating a variant embodiment of the process according to the invention, in which the 0° lay-up direction in each of the wings corresponds to the leading edge of the wing box in each of the wings.

FIG. 3 diagrammatically illustrates a first variant embodiment of the invention in which the 0° direction of the lay-up coordinate system R1, R2 of each of the two wings A1 and A2 corresponds approximately to the direction of the leading edge B1, B2 of the wing box.

Figure 4:
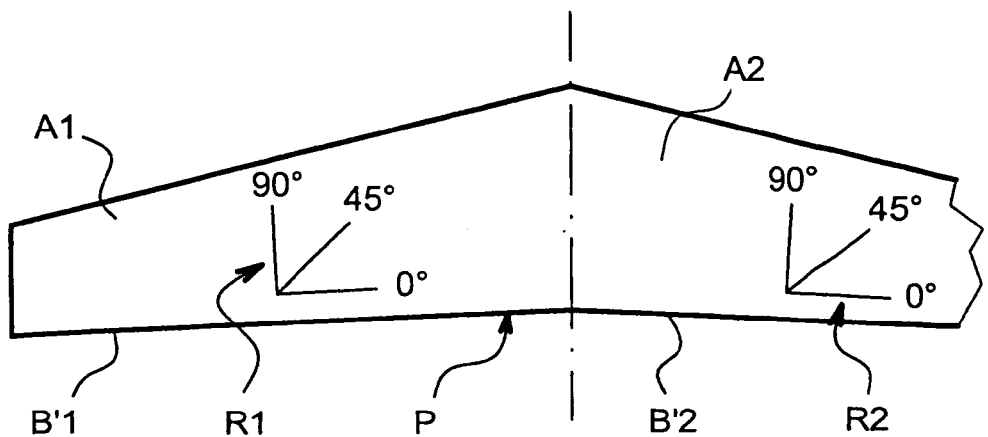
FIG. 4 is a view comparable to FIGS. 2 and 3, illustrating another variant embodiment of the process according to the invention, in which the 0° lay-up direction in each of the wings corresponds to the trailing edge direction of the wing box in each of the wings.

FIG. 4 diagrammatically illustrates a second variant embodiment of the invention, in which the 0° direction of the lay-up coordinate system R1, R2 of each of the two wings A1 and A2 corresponds approximately to the direction of the trailing edge B'1, B'2 of the wing box.

According to another variant embodiment of the invention, not shown, the 0° direction of the lay-up coordinate system R1, R2 of each of the two wings A1 and A2 is approximately oriented along an intermediate direction between the two directions shown in FIGS. 3 and 4.

According to yet another variant embodiment (not shown), the 0° direction of each lay-up coordinate system R1 and R2 goes outside the angular limits defined in the previous variant as being the outside edges of the corresponding portion of the part.

In particular, this variant makes it possible to satisfy aeroelasticity criteria such that the deformed shape of the part is automatically adapted to the forces. The main purpose of this self adaptation is to move an excessive concentration of forces towards a less highly stressed zone.

This variant also enables anisotropic lay-ups, in which one or several lay-up directions are oriented differently. Possible corollaries are that overstresses at the edges of attachment holes can be reduced, margins can be improved or the mass of structures can be reduced if margins are kept the same.

Figure 5:
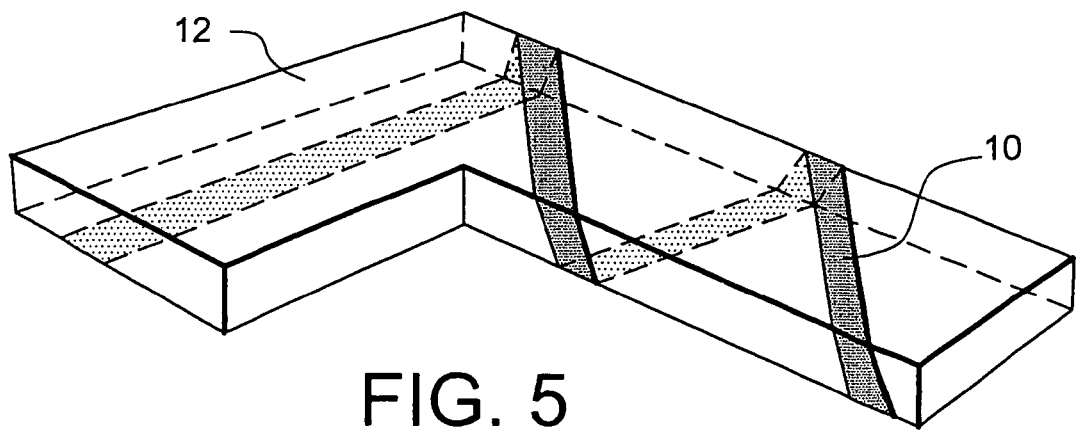
FIG. 5 is a perspective view that diagrammatically illustrates manufacturing of a part according to the invention, using filamentary winding techniques or by layers.

As illustrated very diagrammatically in FIG. 5, the process according to the invention can be used to make the part by continuously winding fibers and/or layers 10 around a mandrel 12, using known filamentary winding techniques or by layers.

For manufacturing reasons, the complete part integrating a junction zone such as that which has just been described above with reference to FIGS. 1 to 4, may possibly be made in several pieces, outside the said zone.

Thus, in the case of an aircraft wing, use of the process according to the invention would make it possible to make the central part of the said wing without a junction and to add end elements to this central zone (wing tips or "outer" wing). In this case, the junctions between the central zone and the end elements are made in a known manner. However, since these junctions are located in a zone of the structure that is less disturbed and less stressed, they are much simpler to design and are lighter in weight than junctions between the two wings using techniques according to prior art.

The process according to the invention may also be used to make aircraft stabilizing elements such as control surfaces. More generally, the process according to the invention may be used to make any composite material part comprising at least one junction zone in which the principal directions intersect at a non-singular angle, by continuous lay-up.

The invention claimed is:

1. Aircraft wing made of a composite material, said wing comprising at least two portions with the angle between the longitudinal axis of said portions being about 135° in a junction zone between the said portions, the aircraft wing being made by a process comprising a winding step of at least one layer of continuous fibers wound around a mandrel along a 0° direction with respect to the longitudinal axis of a first of said portions and along at least one other direction at +/−45° of the 0° direction with respect to the longitudinal axis of a second of said portions, adjacent to the first portion in said junction zone, wherein the at least one layer of continuous fibers is also wound continuously on said mandrel from the first portion to the second portion in the junction zone.

2. Aircraft stabilizing element made of a composite material, said stabilizing element comprising at least two portions with the angle between the longitudinal axis of said portions being about 135° in a junction zone between the said portions, the aircraft stabilizing element being made by a process comprising a winding step of at least one layer of continuous fibers wound around a mandrel along a 0° direction with respect to the longitudinal axis of a first of said portions and along at least one other direction at +/−45° of the 0° direction with respect to the longitudinal axis of a second of said portions, adjacent to the first portion in said junction zone, wherein the said at least one layer of continuous fibers is also wound continuously on said mandrel from the first potion to the second portion in the junction zone.

* * * * *